Aug. 7, 1962 G. K. HELDER ETAL 3,048,819

DETECTION AND MEASUREMENT OF ERRORS IN PULSE CODE TRAINS

Filed Dec. 5, 1960 2 Sheets-Sheet 1

INVENTORS G.K. HELDER
J.S. MAYO
BY R. B. Ardis
ATTORNEY

DETECTION AND MEASUREMENT OF ERRORS IN PULSE CODE TRAINS

Filed Dec. 5, 1960 2 Sheets-Sheet 2

INVENTORS G. K. HELDER
J. S. MAYO
BY R. B. Ardis
ATTORNEY 3,048,819
Patented Aug. 7, 1962

3,048,819

DETECTION AND MEASUREMENT OF ERRORS IN PULSE CODE TRAINS

George K. Helder, Plainfield, and John S. Mayo, Berkeley Heights, N.J., assignors to Bell Telephone Laboratories, Incorporated, New York, N.Y., a corporation of New York Filed Dec. 5, 1960, Ser. No. 73,872
9 Claims. (Cl. 340—146.1)

This invention relates to pulse code communications and, in particular, to means for detecting and measuring errors in a pseudo-ternary pulse code. At the outset it should be explained that an authentic ternary code is one which has a ternary base and three randomly-occurring levels. The three levels of a pseudo-ternary code, on the other hand, do not occur randomly but, rather, in accordance with some basic law; and such a code may have a binary base. Whether ternary or pseudo-ternary, the code takes the form of a bipolar train of pulses.

Spurious signals, such as noise bursts, often engraft themselves upon pulse trains being conveyed from a transmitter to a receiver. When these pulse trains arrive at the receiver, their information content may have been altered. Consider a pseudo-ternary pulse code in which message pulses are constrained to be alternately positive and negative, but, contrary to this constraint, framing pulses are always of the same polarity as the last preceding message pulse. The pulse code system discloed in a copending application, Serial No. 73,873, filed December 5, 1960, by H. Mann et al., employs such a code. In a pseudo-ternary code of this sort, two consecutive message pulses of the same polarity cannot legitimately occur. Violations of this polarity constraint are identifiable as errors. But where a framing pulse is constrained to be of the same polarity as the next preceding message pulse, it too constitutes a violation; and it remains to be determined whether a violation is an error in fact or a bona fide framing pulse.

Noise bursts may, as intimated above, give rise to error pulses that appear as polarity violations. It is important in the installation and maintenance of pulse code systems to be able to detect and measure these error pulses. At the same time, it is essential that framing pulses be distinguished if, by predetermination, they must also appear as polarity violations.

Ideally, an error detector, capable of making this distinction and suitable for installation and maintenance purposes, should be operationally as simple as a voltmeter. It should be capable of checking system performance anywhere along the path of transmission. Its use should not require an interruption of normal communication. It is the primary object of this invention to accomplish these ends.

Digital data communications are particularly susceptible to impairment by impulse noise, much more so than are voice communications, where the nature of the human ear and the redundancy of speech are countervailing factors. An error rate acceptable for encoded speech may be intolerable for digital data and, consequently, necessitate the addition of curative equipment. The invention, although characterized by its simplicity, permits a ready and effective ascertainment of a system's rate of error.

In accordance with the invention, pseudo-ternary pulses are rectified and gated, according to their former polarity, into a bipolar violation detector. In the detector, the binary states of the output terminals of a bistable circuit, which switches from one state to another in response to the incoming rectified pulses, are compared with the time occurrences of these pulses. If these stimuli—i.e., the binary states of the bistable circuit outputs and the incoming pulses—occur simultaneously, pulses representing polarity violations are generated. These pulses are then fed to a circuit, comprising a monostable multivibrator, which disregards framing pulses as violations, and supplies the other violations to a registering circuit.

The following description will impart a better understanding of the invention. In the drawings.

Figure 2:
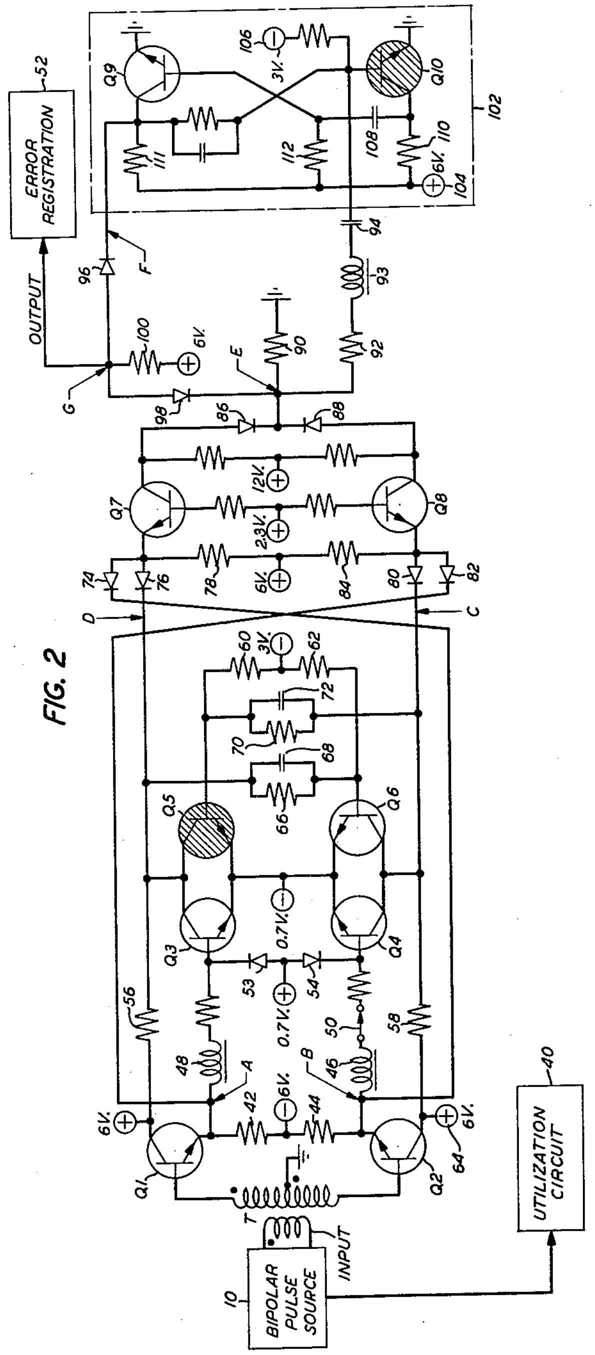
FIG. 2 is a detailed circuit diagram of an illustrative embodiment of the invention.

To facilitate the task of describing and understanding the invention, we shall assume that no delays, other than those shown, exist in the circuit of FIG. 2. With this assumption in mind, it will be noted that the circuit provides no compensation for finite switching times, and that each pulse of FIGS. 3 and 4 occurs promptly at the commencement of its encompassing time slot. In practice, however, such compensation could prove necessary; for bit rates of 40 megacycles per second are encountered in some pulse code systems (e.g., television)—rates that necessitate switching speeds of a few millimicroseconds, and render otherwise slight delays a matter of concern.

Figure 1:
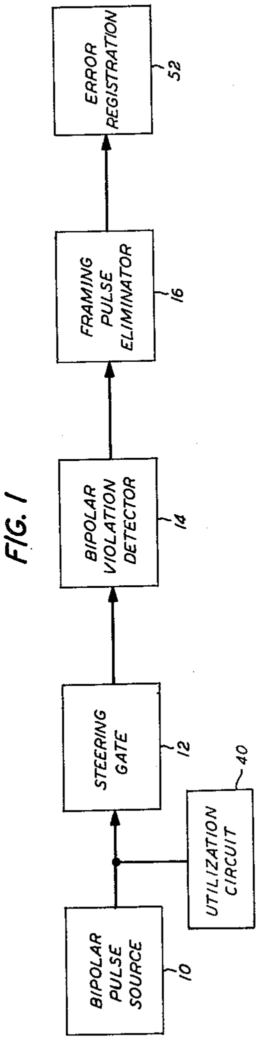
FIG. 1 is a block schematic diagram, arranged in accordance with the invention and illustrating, in a very general way, the principal operations to be performed in the circuit of FIG. 2.
Figure 4:
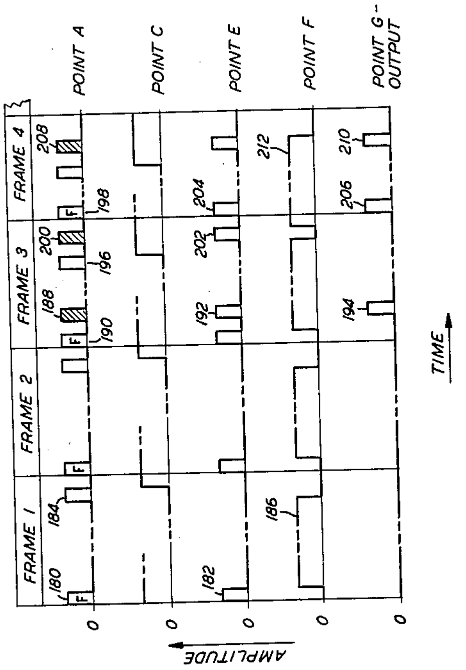
FIG. 4, another plot of wave forms, though cast in larger time perspective than is the plot of FIG. 3, helps to convey an understanding of how framing pulses are purposely disregarded in the circuit of FIG. 2.
Figure 3:
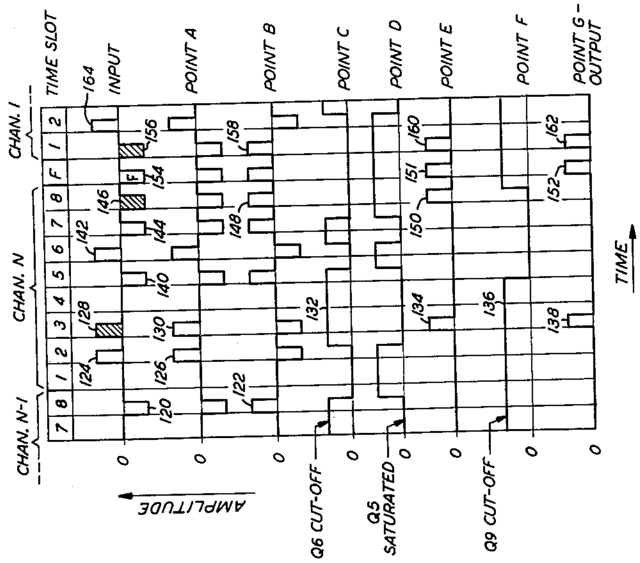
FIG. 3 is a plot of wave forms, which occur at various indicated points in the circuit of FIG. 2 and are helpful in understanding the processes that occur in that circuit.

Since the wave forms of FIGS. 3 and 4 will be referred to often in the description of FIGS. 1 and 2, we should consider them for a moment. Both FIG. 3 and FIG. 4 are plots of amplitude with respect to time. In FIG. 3, the abscissa is broken up into time slots; in FIG. 4, time is compressed so that the abscissa is made up of frames. It will be recalled that time slots are the shortest time elements in a pulse code system operating in time-division multiplex. They are used to encompass code digits, which electrically take the form of pulses and spaces. The number of digits employed to represent the instantaneous value of a message being transmitted in a channel and the number of multiplexed channels will determine the number of time slots in a frame. To this number, one framing time slot (labeled "F" in FIG. 3) is added to accommodate synchronizing information. For present purposes, we shall assume eight digits per sample and twenty-four channels. Consequently, each frame will contain 193 periodically recurrent time slots, including the one for synchronization. FIG. 3 shows only the concluding time slots of one frame and the first two time slots of the next frame. FIG. 4 shows a succession of frames and some of the digits occurring within them. In FIGS. 3 and 4, framing pulses are labeled "F," and noise pulses are hatched.

It should be noted that the wave forms of FIGS. 3 and 4 are theoretical, since they comprise unit step voltages; i.e., they undergo instantaneous changes in amplitude from one constant level to another. In practice, the wave forms encountered in the circuit of FIG. 2 would not comprise unit step voltages. The effect of the transistors of that circuit on the ideal pulses of FIGS. 3 and 4 is well known. Actually, these pulses would be distorted, since transistors do not respond instantaneously to changes in signal level and their transient response gives rise to such distortive phenomena as rise time (the period needed for a pulse to rise from 10 percent to 90 percent of its maximum value), storage time (the period needed to collect minority carriers that have been injected into the base region), and fall time (the period required for a pulse to fall from 90 percent to 10 percent of its maximum amplitude).

FIG. 1 shows, in broad perspective, the principal functions of the circuit depicted in FIG. 2. We see at the left hand a bipolar pulse source 10, whose product is the pseudo-ternary wave form labeled "input" in FIG. 3. The pulse source 10 supplies this wave form to a utilization circuit 40, which may be a receiver or a repeater, and to a steering gate 12, which separates the incoming pulses into two pulse trains. These trains, which appear at points A and B of FIG. 2 and are so identified in FIG. 3, are fed into a bipolar violation detector 14, which detects violations of the polarity constraint discussed above. As was previously mentioned, these violations may comprise intended violations (i.e., those employed for framing synchronization) and suprious ones due to a noisy transmission medium. Because the measurement of spurious violations alone is of interest, detected violations are fed to the eliminator 16, which disregards those due to framing and feeds the remainder, if any, to the error registration circuit 52. An electronic digital counter would probably best perform the function of circuit 52. It is certainly the best method for displaying the error rate of the incoming pulse train. But a storage counter or an integrating circuit could also be used to perform the function of circuit 52. These alternative means for error measurement are more simple and less costly than the digital counter and, for these reasons, may be preferable in certain cases. The performance and structural details of the very generalized elements of FIG. 1 will now be considered in FIG. 2.

In FIG. 2, relative values have been assigned to the various sources of potential, in order to distinguish them from one another. Pseudo-ternary pulses from the pulse source 10 are supplied to the transformer T. These pulses are shown in the input wave form of FIG. 3 and include error pulses, which, as previously mentioned, are hatched for the sake of identification. Separating in the secondary winding of transformer T in the manner indicated by the polarity markings, these pulses proceed to the bases of transistors Q1 and Q2. As emitter followers, transistors Q1 and Q2 present a high input impedance to the incoming pulses. Because of this high input impedance, bridging loss is minimal and normal transmission from the source 10 to the utilization circuit 40 (e.g., a receiver) will, as a practical matter, be unaffected. The high input impedance is due to the large negative voltage feedback in the base-emitter circuits of transistors Q1 and Q2. As the respective input voltages to these elements rise, the opposing voltages developed across the load resistors 42 and 44 substantially reduce the net voltages across the base-emitter junctions of transistors Q1 and Q2. The current drawn through the transformer T from the source 10 is therefore relatively small, most of it proceeding to the utilization circuit 40.

The output waveforms of transistors Q1 and Q2 appear, as shown in FIG. 3, at the points A and B, respectively, of FIG. 2. As these waves progress to the trigger-transistors Q3 and Q4, they are delayed by an interval substantially equal to a pulse width, or one-half of a time slot. The delay is provided by the delay lines 46 and 48.

Immediately following the delay line 46 is a switch 50 which is a means for determining—when the need for doing so arises—whether the source 10 is quiescent or whether it is supplying an error-free pulse train. As we shall see, when the switch 50 is opened to make this determination, errors necessarily will be registered in the registration circuit 52; for to open this switch is to cause pulses to be supplied by way of transistor Q3 only, and these pulses, being unipolar, will constitute successive violations of the polarity restraint previously discussed. One would make this determination if, for example, no errors were being registered. The question would then arise whether or not any pulses were being received. If, upon opening the switch 50, errors should commence to be registered, then it would be known that the pulse train being received from the source 10 is indeed error-free. If on the other hand, no errors should be discerned, then it would be established that the source 10 is quiescent.

The transistors Q3 and Q4 are trigger devices which trigger the transistors Q5 and Q6, the active elements of a bistable multivibrator. The diodes 53 and 54 clamp the bases of transistors Q3 and Q4 so that, in the absence of incoming pulses, these bases are maintained substantially at ground potential. This potential, though not enough to cause conduction in Q3 or Q4, allows them to turn on more quickly.

The operation of the bistable circuit, consisting of transistors Q5 and Q6 as active elements, is as follows. Assume that transistor Q5 is cut off and that transistor Q6 is conducting. A positive trigger pulse, supplied by the emitter of transistor Q1 to the base of transistor Q3, causes the latter to conduct. The collector current of transistor Q3 rises and causes the collector voltage to decrease. Since the collector of Q3 is coupled to the base of Q6, this change in voltage reduces the forward bias across the base-emitter junction of Q6. Conduction in Q6 therefore decreases. The collector current of Q6 diminishes and the collector voltage changes from zero to a positive value substantially equal to that of the potential source 64. Now since the collector of Q6 is coupled to the base of Q5, the base of Q5 becomes more positive, increasing the conduction of Q5. This regenerative feedback continues until the transistor Q5 is in saturation and Q6 is cut off. During this rapid transition period both Q5 and Q6 conduct, conduction decreasing in one while increasing in the other. The period of transition from conduction to cut-off of transistors Q5 and Q6 is primarily determined by the time constants of resistor 66 and capacitor 68 and of resistor 70 and capacitor 72, respectively.

The collectors of transistors Q5 and Q6 are coupled to the points D and C, respectively. The transistor Q5 has been hatched to show that it is in saturation (and consequently that its collector and the point D are substantially at ground potential) at the commencement of the first time slot of FIG. 3.

Diodes 74 and 76 and resistor 78 make up an AND gate, as do diodes 80 and 82 and resistor 84. The AND gate comprising diodes 74 and 76 is enabled when positive stimuli from point B (the output of transistor Q2) and from the collector of transistor Q5 are supplied simultaneously to these diodes. Enablement of this AND gate will cause an impulse to be supplied to the amplifier Q7 and ultimately to the diode 86. Diodes 86 and 88 and resistor 90 form an OR gate. The appearance of an impulse at either diode 86 or diode 88 will enable the OR gate, causing an impulse to be present at the point E.

Positive levels, appearing simultaneously at point A, the output of transistor Q1, and point C, the output of transistor Q6, will enable the AND gate comprising diodes 80 and 82. Transistor Q8 amplifies the output of this AND gate and then supplies it to the diode 88, whence it ultimately appears at the point E.

Two paths are offered to a positive level occuring at point E. A first path proceeds through the resistor 92, the delay line 93, and the coupling capacitor 94 to the base of transistor Q10. Transistor Q10 is one of the active elements of a monostable multivbrator 102 (the other being the transistor Q9), whose input is the base of transistor Q10, and output the collector of transistor Q9. The first path therefore continues from the collector of transistor Q9 to the diode 96. Diodes 96 and 98 and resistor 100 form an AND gate. The delay line 93 delays the progression from point E by an interval substantially equal to one pulse width.

The second path emanating from point E leads directly to the diode 98. When stimuli appear simultaneously at the diodes 96 and 98, an impulse is supplied to the error registration circuit 52 and there recorded. The two paths leading from point E and terminating at the point G make up the framing pulse eliminator 16 of FIG. 1.

The process by which framing pulses are eliminated will be discussed later in connection with FIGS. 3 and 4. It will be helpful first to consider the operation of the monostable circuit 102. The circuit is quiescent (in its normal mode of operation) when it is in its stable state, and will remain so until it is triggered into its quasi-stable state by the application of a pulse at the base of transistor Q10. It will be held in this state for an interval, determined by the time constant of various elements, whereupon it will return to its quiescent state. The hatching of transistor Q10 in FIG. 2 is intended to show that it is in saturation at the beginning of the first time slot of FIG. 3 and, consequently, that the monostable circuit 102 is in its quasi-stable state at that time.

During quiescence, bias arrangements and regenerative feedback hold transistor Q9 in saturation and transistor Q10 at cut-off. When a trigger pulse is supplied to the base of transistor Q10, the monostable circuit 102 begins its transition to the quasi-stable state, and functions independently of external stimuli for one full cycle until it again becomes stable. The potential source 104 provides collector bias voltage for transistors Q9 and Q10 and forward-biases transistor Q9 during quiescence. At the same time, potential source 106 reverse-biases the base-emitter circuit of transistor Q10 and thus maintains Q10 at cut-off. Capacitor 108 couples the collector of transistor Q10 to the base of transistor Q9 and is charged to the voltage of source 104 through the resistor 110 and the base-emitter junction of transistor Q9.

Application of a trigger pulse to the coupling capacitor 94 and thence to the base of transistor Q10 causes the transistor to begin conduction. The high positive voltage at its collector begins to fall, causing the forward bias across the base-emitter junction of transistor Q9 to decrease. Concomitantly, the base and collector currents of transistor Q9 decrease and its collector voltage (positive) increases. This increasing collector voltage, coupled regeneratively to the base of transistor Q10, causes a rapid transition in the conductivity state of transistor Q10, which is driven into saturation as transistor Q9 goes into cut-off. The circuit 102 is now quasi-stable. Capacitor 108 begins charging through the resistor 112 and the low collector-emitter saturation resistance of transistor Q10. The base potential of transistor Q9 becomes more positive and Q9 begins to conduct, driving Q10 quickly into cut-off. The circuit 102 is again stable, and remains so until another trigger pulse appears at the base of transistor Q10. As was previously mentioned, the pulse output of the monostable circuit 102 is taken from the collector of transistor Q9 (point F). The time duration of this pulse, which represents the period of quasi-stability of circuit 102, is determined primarily by the time constant of resistor 112 and capacitor 108. In accordance with the invention, the quasi-stable period of the monostable circuit 102 is constrained to be greater than one-half but less than the entire interval between two successive framing pulses. By so constraining the circuit, cognizance is not taken of polarity violations due to framing pulses. Only spurious violations are recorded in the error registration circuit 52.

The manner in which the circuit of FIG. 1 recognizes noise pulses in the input pulse train emanating from the source 10 is best understood from a consideration of FIGS. 3 and 4. The input wave form of FIG. 3 includes noise pulses, which are hatched for distinction. Pulse 120, the first input pulse, occurs in the eighth time slot of channel N–1 and undergoes a polarity reversal at point B, appearing there as the pulse 122. We previously assumed that each frame consists of 24 channels, so that N, in keeping with that assumption, equals 24.

The bistable circuit comprising the transistors Q5 and Q6 has two outputs, one at the collector of each of these transistors. We shall refer to the outputs of Q5 and Q6 as the D and C outputs, respectively, since they are so labeled in FIGS. 2 and 3. We shall assume that the D and C outputs are initially in the binary zero and one states, respectively. The pulse 122 causes these states to be interchanged in the eighth time slot of channel N–1. Since the diodes 80 and 82 will not permit the supply of an impulse to point E unless positive pulses simultaneously appear at points A and C, and since diodes 74 and 76 also will not do so unless positive pulses simultaneously appear at points B and D, point E remains at zero level during the seventh and eighth time slots of channel N–1. Consequently, no output error pulses occur at that time.

The operations generated by the pulse 124 are similarly ineffective to produce an output error pulse; for as can be seen in FIG. 3, simultaneity of positive levels exists neither between points A and C nor between points B and D. But the pulse 126 does cause transistors Q5 and Q6 to interchange conductivity states, so that points C and D are respectively in the binary one and zero states.

Pulse 128 constitutes a polarity violation, since it is of the same polarity as the next preceding message pulse. We know it to be a noise pulse; the circuit of FIG. 1 will also make this determination. The pulse 130 occurs while point C is in the binary one state. The pulse 134 is therefore produced at point E. Now since the transistor Q9, the output transistor of the monostable circuit 102 of FIG. 2, is cut off at this time, a positive voltage level 136 exists at point F, as can be seen in FIG. 3. An error pulse 138 is therefore supplied to the error registration circuit 52.

The input pulses 140, 142 and 144, occurring in the fifth, sixth and seventh time slots of channel N, legitimately follow the polarity constraint imposed at the source 10 of FIG. 2. Consequently, none of these pulses gives rise to an error pulse at point G. However, each of them does cause the transistors Q5 and Q6 to interchange conductivity states, as indicated by the wave forms occurring at points C and D.

The input pulse 146, occurring in the eighth time slot of channel N, is a spurious polarity violation. It causes a pulse 148 to appear at point B. Since point D is at a positive level at this time, the pulse 150 appears at point E. But since the monostable circuit 102 is in its stable state (transistor Q9 is in saturation) at this time and the resistor 111 accounts for substantially all of the voltage drop between the source 104 and the emitter of transistor Q9, the point F is at ground potential and the AND gate, of which diode 96 is a part, is not enabled. Consequently, the input noise pulse 146 is not recorded by registration circuit 52 at this time. However, it will be recorded in the next time slot, for pulse 150 has again driven transistor Q10 into saturation and Q9 into cut-off; and point F will be at the potential of source 104 when pulse 151 arrives at point E. Together, the potentials of points E and F will activate point G, thereby supplying an error pulse 152 to the circuit 52. It is well to note that an input noise pulse 146 and the output error pulse 152 which represents it at the point G of FIG. 2 need not occur at the same time. This time relationship existed between the input noise pulse 128 and its ultimate representative, pulse 138. But the output pulse 152, offspring of the noise pulse 146, will not come into being until the next time slot, which is the framing slot F.

The pulse 154 of FIG. 3 is a framing pulse; it synchronizes the two ends of the system, the pulse source 10 and utilization circuit 40; it is an intended violation of the polarity restriction imposed upon the other pulses. As such, it causes a pulse to appear at point E. And because point F is simultaneously at a positive potential, the output error pulse 152 is supplied to the error registration circuit 52. Now it is important to note that the output error pulse 152 is not really a product of the framing pulse 154. Had the noise impulse 146 not occurred, the pulse 150 would not have been produced; and the monostable circuit 102 would not have been driven into its quasi-stable state. The point F would therefore have been at ground potential when the pulse 151 arrived at point E, and the output error pulse 152 could not have been produced. Consequently, pulse 152 is the delayed product of the noise impulse 146. Framing pulses are thus ignored in the output error rate determined by the registration circuit 52. We will further consider the elimination of framing pulses from this error-rate determination when we get to FIG. 4.

The noise pulse 156 is another polarity violation. A positive replica 158 of this pulse appears at point B; and since the transistor Q5 is cut off at this time, point D is at a positive potential. Consequently, a pulse 160 is supplied to point E and, ultimately, an output error pulse 162 appears at point G to be registered in the circuit 52. The processes generated by the message pulse 164 are identical to those that were produced by the message pulse 124.

In FIG. 4, time is delimited in frames, which are only partially filled, as indicated by the dashed lines in each wave form. For ease of narration only positive noise and framing pulses are shown at point A, so that we need only be concerned with points A, C, E, F and G of FIG. 4. The quasi-stable state of the monostable circuit 102 (FIG. 2) persists for more than half but less than a complete framing interval—say, 70 percent of a framing interval. As in FIG. 3, we assume that transistor Q6 is cut off at the commencement of our time pattern, so that point C is at a positive potential at the beginning of frame 1. But, in contrast to FIG. 3, we assume that the monostable circuit 102 of FIG. 2 is in its stable state (transistor Q9 is in saturation, and point F therefore at ground potential) at the beginning of frame 1.

The framing pulse 180 is of the same polarity as the next preceding message pulse (not shown). Consequently, transistor Q6 remains cut off and point C stays in the binary one state, i.e., at a positive potential. Since points A and C are simultaneously positive, a pulse 182 is produced at point E. Delayed one pulse width by the delay inductor 93, pulse 182 forward-biases the base-emitter junction of transistor Q10, driving it into saturation and transistor Q9 into cut-off. Point F rises to the potential level of source 104 after the expiration of pulse 182 at point E, so that point G is not enabled. The pulse 184 is the last message pulse of frame 1. It serves to change the binary state of point C, but produces no pulse at point E. The pulse 186, output of the monostable circuit 102, expires in frame 1 after an interval determined by the time constant of capacitor 108 and resistor 112. The events occurring in frame 1 are repeated in frame 2. No noise pulses occur in either of these frames.

A noise pulse 188 appears after the framing pulse 190. Pulse 188 produces a pulse 192 at point E, since points A and C are both positive; and since points E and F are also both positive, an output error pulse 194 appears at point G. A noise pulse 200 appears between the message pulse 196 and the framing pulse 198, causing a pulse 202 to appear at point E, which in turn (one pulse width later) triggers the monostable circuit 102 into its quasi-stable state. The noise pulse 200 ultimately appears at point G as an error pulse 206 when pulse 204 joins with the positive level at point F to energize point G. The noise pulse 208 also produces an error pulse 210 at point G. It should be noted that if pulse 208 had occurred after the expiration of pulse 212, the output of the monostable circuit 102, then the error pulse 210 would not have immediately appeared. Rather, its appearance would have been postponed until the occurrence of the next polarity violation (not shown).

In any event, it is unimportant, as was previously explained, just when a noise pulse is registered in the circuit 52. What is important is the rate at which these errors occur; and this rate is established, in accordance with the invention, whether or not a noise pulse is immediately recognized.

Although an illustrative embodiment has been used to describe the invention, other embodiments and modifications within the invention's spirit and scope will readily occur to those skilled in the art.

What is claimed is:

1. A circuit for the detection of errors in a pseudo-ternary train of pulses being transmitted over a medium, comprising coupling means for connecting said circuit to said medium for the reception of said pulses, a bistable multivibrator having a pair of inputs and a pair of outputs, a pair of conductive paths, one for conveying the negative pulses of said train to one of said pair of multivibrator inputs and the other of said paths for conveying the positive pulses of said train to the other of said pair of inputs, each of said paths including a delay circuit having a delay period substantially equal to the pulse width of said pulses, a pair of AND gates each having a pair of inputs and an output, means connecting each of said multivibrator outputs to an input of an associated one of said AND gates, means connecting said coupling means to the other inputs of said AND gates, an OR gate having a pair of inputs and an output, means connecting the outputs of said AND gates to said inputs of said OR gate, and means connected to said output of said OR gate for registering said errors.

2. A circuit in accordance with claim 1 in which said means for registering said errors is an electronic digital counter.

3. Apparatus for detecting the presence of errors in a train of pseudo-ternary pulses, delimited in frames by periodically recurring framing pulses and having a polarity constraint such that each message pulse of said train is of polarity opposite to that of the next preceding message pulse and each framing pulse of said train is of the same polarity as the next preceding message pulse, comprising means for detecting violations of said polarity constraint, means for segregating said pseudo-ternary pulses according to their polarity, means interconnecting said detecting means and said segregating means for conveying said segregated pulses to said detecting means, means for registering said violations, and means interconnecting said detecting means and said registering means for preventing the registration of said framing pulses in said registering means.

4. A circuit for the detection of errors in a train of bipolar pulses being transmitted over a medium comprising coupling means for connecting said circuit to said medium for the reception of said pulses, said coupling means including means for presenting a high impedance to said train of pulses to prevent the loading down of said medium by said circuit, a bistable multivibrator having a pair of inputs and a pair of outputs, a pair of conductive paths, one for conveying the negative pulses of said train to one of said pair of multivibrator inputs and the other of said paths for conveying the positive pulses of said train to the other of said pair of inputs, each of said paths including a delay circuit having a delay period substantially equal to the pulse width of said pulses, a pair of AND gates each having a pair of inputs and an output, means connecting each of said multivibrator outputs to an input of an associated one of said AND gates, means connecting said coupling means to the other inputs of said AND gates, an OR gate having a pair of inputs and an output, means connecting the outputs of said AND gates to said inputs of said OR gate, and means connected to said output of said OR gate for registering said errors.

5. A circuit for the detection of errors in a train of bipolar pulses being transmitted over a medium comprising coupling means for connecting said circuit to said medium for the reception of said pulses, a bistable multivibrator having a pair of inputs and a pair of outputs, a pair of conductive paths, one for conveying the negative pulses of said train to one of said pair of multivibrator inputs and the other of said paths for conveying the positive pulses of said train to the other of said pair of inputs, each of said paths including a delay circuit having a delay period substantially equal to the pulse width of said pulses, switching means included in one of said pair of paths for determining whether pulses are being transmitted over said medium, a pair of AND gates each having a pair of inputs and an output, means connecting each of said multivibrator outputs to an input of an associated one of said AND gates, means connecting said coupling means to the other inputs of said AND gates, an OR gate having a pair of inputs and an output, means connecting the outputs of said AND gates to said inputs of said OR gate, and means connected to said output of said OR gate for registering said errors.

6. A circuit for the detection of errors in a train of bipolar pulses being transmitted over a medium comprising coupling means for connecting said circuit to said medium for the reception of said pulses, a bistable multivibrator having a pair of inputs and a pair of outputs, a pair of conductive paths, one for conveying the negative pulses of said train to one of said pair of multivibrator inputs and the other of said paths for conveying the positive pulses of said train to the other of said pair of inputs, each of said paths including a delay circuit having a delay period substantially equal to the pulse width of said pulses, a pair of AND gates each having a pair of inputs and an output, means connecting each of said multivibrator outputs to an input of an associated one of said AND gates, means connecting said coupling means to the other inputs of said AND gates, an OR gate having a pair of inputs and an output, amplifier means interconnecting each said AND gate output with an associated one of said OR gate inputs, and an integrator circuit for recording said errors.

7. Apparatus for detecting the presence of errors in a pseudo-ternary train of pulses delimited in frames by periodically recurring framing pulses, each message pulse of which is of polarity opposite to that of the next preceding message pulse and each framing pulse of which is of the same polarity as the next preceding message pulse, comprising a bistable circuit having a pair of inputs for changing the state of equilibrium thereof and a pair of outputs, a pair of AND gates each having a pair of inputs and an output, means for conveying the negative pulses of said train to an associated input of one of said pair of AND gates and an associated input of said bistable circuit, means for conveying the positive pulses of said train to an associated input of the other of said AND gates and the other input of said bistable circuit, said means for conveying said pulses to said bistable circuit inputs each including a delay circuit postponing the arrival of said pulses by a period substantially equal to the duration of one of said pulses, means interconnecting the outputs of said bistable circuit with the remaining inputs of said AND gates, an OR gate having a pair of inputs connected to the outputs of said AND gates and having an output, means for registering said errors, and means interconnecting said register means and said output of said OR gate for preventing the registration of said framing pulses as errors.

8. In combination, means for producing a train of pseudo-ternary pulses, delimited in frames by periodically recurring framing pulses and having a polarity constraint such that each message pulse of said train is of a polarity opposite to that of the next preceding message pulse and each framing pulse thereof is of the same polarity as the next preceding message pulse; apparatus for detecting the presence of errors in said train comprising means for detecting violations of said polarity constraint, means for segregating said pseudo-ternary pulses according to their polarity into two subtrains, delay means for conveying said segregated pulses separately to said detecting means for segregating said pseudo-ternary pulses according to their polarity into two subtrains, means for detecting violations of said polarity constraint, delay means for conveying said subtrains separately to said detecting means, means for determining the time-rate of said errors, and means interconnecting said time-rate determining means and said detecting means for disregarding said framing pulses in the determination of said error time rate.

9. The combination, as defined in claim 8, in which said means for disregarding framing pulses comprises a pair of alternate conductive paths, one of which comprises delay means having a delay period substantially equal to a pulse interval and a monostable circuit which includes means to render the period of quasi-stability of said circuit greater than one-half but less than the interval between two successive framing pulses.

References Cited in the file of this patent

UNITED STATES PATENTS 2,700,696 Barker ---------------- Jan. 25, 1955